(12) United States Patent
Seitz et al.

(10) Patent No.: US 10,155,233 B2
(45) Date of Patent: Dec. 18, 2018

(54) SPLASH PLATE RETENTION METHOD AND APPARATUS

(75) Inventors: David M. Seitz, Riga, MI (US); Joe Louis Bates, Curtice, OH (US); Kurt Granville Miller, Perrysburg, OH (US)

(73) Assignee: CARLISLE FLUID TECHNOLOGIES, INC., Scottsdale, AZ (US)

( * ) Notice: Subject to any disclaimer, the term of this patent is extended or adjusted under 35 U.S.C. 154(b) by 1064 days.

(21) Appl. No.: 12/420,295

(22) Filed: Apr. 8, 2009

(65) Prior Publication Data

US 2009/0255463 A1 Oct. 15, 2009

Related U.S. Application Data

(60) Provisional application No. 61/043,570, filed on Apr. 9, 2008.

(51) Int. Cl.
*B05B 3/10* (2006.01)
*B05D 1/40* (2006.01)
(Continued)

(52) U.S. Cl.
CPC .......... *B05B 3/1028* (2013.01); *B05B 3/1014* (2013.01); *B05B 3/1064* (2013.01); *B05D 1/40* (2013.01); *B01D 23/205* (2013.01); *B05B 5/0407* (2013.01); *Y10S 239/14* (2013.01); *Y10S 901/43* (2013.01)

(58) Field of Classification Search
CPC ... B05B 5/0407; B05B 3/1064; B05B 3/1014; B05B 3/1042; B05B 1/02; B05B 1/14; B05B 11/04; B05B 15/001; B05B 15/065; B05B 2012/00; B05B 3/10; B05B 3/02; B05B 3/1007; B05B 3/1028; B05B 3/1085
USPC ........ 118/300, 629, 621; 239/223, 700, 432, 239/518, 596, 505; 384/140; 277/348; 134/198; 427/421.1
See application file for complete search history.

(56) References Cited

U.S. PATENT DOCUMENTS 1,589,241 A * 6/1926 Lane .......................... 239/533.9
2,759,763 A 8/1956 Juvinall
(Continued)

FOREIGN PATENT DOCUMENTS

DE 9418021 12/1994
EP 1250961 A1 * 10/2002
(Continued)

OTHER PUBLICATIONS

International Search Report for application No. PCT/US2009/039991 mailed Jun. 24, 2009.
(Continued)

*Primary Examiner* — Karl Kurple
(74) *Attorney, Agent, or Firm* — Fletcher Yoder, P.C.

(57) ABSTRACT

A splash plate assembly is retained in a rotary bell cup by a barbed skirt that interfaces with an inner surface of the bell cup. The splash plate assembly includes a splash plate or deflector that is secured to the front side of an insert. The insert has barbed extensions that may form a skirt around an outer periphery thereof. The insert is snapped into the front bell opening of a bell cup, and the barbed extensions elastically deform and snap back outwardly to interface with a shoulder formed in the bell cup inner surface.

20 Claims, 2 Drawing Sheets

(51) Int. Cl.
  *B05B 5/04* (2006.01)
  *B01D 24/00* (2006.01)

(56) References Cited

U.S. PATENT DOCUMENTS

| | | | |
|---|---|---|---|
| 2,955,565 | A | 10/1960 | Schotland |
| 3,102,062 | A | 8/1963 | Graham et al. |
| 3,233,655 | A | 2/1966 | Graham |
| 3,536,514 | A | 10/1970 | La Faye et al. |
| 3,575,344 | A | 4/1971 | Angelico |
| 3,578,997 | A | 5/1971 | Felici |
| 3,589,607 | A | 6/1971 | Wolf |
| 3,610,528 | A | 10/1971 | Felici |
| 3,684,174 | A | 8/1972 | Bein |
| 3,698,636 | A | 10/1972 | Szasz |
| 3,716,103 | A * | 2/1973 | Tanaka et al. ............... 169/42 |
| 3,843,054 | A | 10/1974 | Kendall et al. |
| 3,913,523 | A | 10/1975 | Probst et al. |
| 3,964,683 | A | 6/1976 | Gimple |
| 4,037,561 | A | 7/1977 | LaFave et al. |
| 4,039,145 | A | 8/1977 | Felici et al. |
| 4,066,041 | A | 1/1978 | Buschor et al. |
| 4,084,750 | A * | 4/1978 | Fett ............................. 239/600 |
| 4,114,564 | A | 9/1978 | Probst |
| 4,135,667 | A | 1/1979 | Benedek et al. |
| 4,169,560 | A | 10/1979 | Vohringer |
| 4,171,100 | A | 10/1979 | Benedek et al. |
| 4,214,708 | A | 7/1980 | Lacchia |
| 4,215,818 | A | 8/1980 | Hopkinson |
| 4,216,915 | A | 8/1980 | Hengartner et al. |
| 4,323,197 | A | 4/1982 | Morishita et al. |
| 4,350,304 | A | 9/1982 | Sugiyama et al. |
| 4,360,155 | A | 11/1982 | Hubbell et al. |
| 4,381,079 | A | 4/1983 | Allen |
| 4,402,991 | A | 9/1983 | Meisner |
| 4,422,577 | A | 12/1983 | Arnold et al. |
| 4,447,008 | A | 5/1984 | Allen |
| 4,450,785 | A | 5/1984 | Meisner |
| 4,505,430 | A | 3/1985 | Rodgers et al. |
| 4,518,119 | A | 5/1985 | Vetter |
| 4,520,754 | A | 6/1985 | Gange et al. |
| 4,580,727 | A | 4/1986 | Moos |
| 4,598,870 | A | 7/1986 | Schloz |
| 4,643,357 | A * | 2/1987 | Culbertson et al. .......... 239/112 |
| 4,685,620 | A | 8/1987 | Law et al. |
| 4,726,521 | A | 2/1988 | Simm et al. |
| 4,736,893 | A * | 4/1988 | Norskov ...................... 239/590.3 |
| 4,760,965 | A * | 8/1988 | Schneider .................... 239/701 |
| 4,779,805 | A | 10/1988 | Jackson et al. |
| 4,785,995 | A | 11/1988 | Yamane et al. |
| 4,788,933 | A | 12/1988 | Buschor |
| 4,798,340 | A | 1/1989 | Vohringer et al. |
| 4,802,625 | A | 2/1989 | Buschor |
| 4,825,807 | A | 5/1989 | Nakamurae et al. |
| 4,879,137 | A | 11/1989 | Behr et al. |
| 4,890,190 | A | 12/1989 | Hemming |
| 4,896,384 | A | 1/1990 | Dijkhuizen |
| 4,919,333 | A * | 4/1990 | Weinstein ..................... 239/223 |
| 4,921,172 | A | 5/1990 | Belmain et al. |
| 4,943,005 | A * | 7/1990 | Weinstein ..................... 239/223 |
| 4,997,130 | A | 3/1991 | Weinstein |
| 5,353,995 | A | 10/1994 | Chabert |
| 5,358,182 | A | 10/1994 | Cappeau et al. |
| 5,433,387 | A | 7/1995 | Howe et al. |
| 5,622,563 | A | 4/1997 | Howe et al. |
| 5,632,448 | A | 5/1997 | Alexander et al. |
| 5,633,306 | A | 5/1997 | Howe et al. |
| 5,662,278 | A | 9/1997 | Howe et al. |
| 5,680,013 | A * | 10/1997 | Dornfest et al. ........... 315/111.21 |
| 5,685,495 | A * | 11/1997 | Pham ...................... B05B 3/1042 239/588 |
| 5,720,436 | A | 2/1998 | Buschor |
| 5,897,060 | A * | 4/1999 | Kon et al. ..................... 239/223 |
| 5,957,395 | A | 9/1999 | Howe et al. |
| 6,003,785 | A * | 12/1999 | Duey ............................ 239/223 |
| 6,056,215 | A * | 5/2000 | Hansinger et al. .......... 239/703 |
| 6,076,751 | A | 6/2000 | Austin et al. |
| 6,189,804 | B1 * | 2/2001 | Vetter et al. ..................... 239/7 |
| 6,230,993 | B1 | 5/2001 | Austin et al. |
| 6,322,011 | B1 | 11/2001 | Allen |
| 6,328,224 | B1 | 12/2001 | Alexander |
| 6,341,734 | B1 | 1/2002 | Van Der Steur |
| 6,360,962 | B2 * | 3/2002 | Vetter et al. ................. 239/106 |
| 6,557,781 | B2 * | 5/2003 | Kon ............................. 239/224 |
| 6,578,779 | B2 * | 6/2003 | Dion ............................ 239/700 |
| 6,623,561 | B2 * | 9/2003 | Vetter et al. ................. 118/314 |
| RE38,526 | E * | 6/2004 | Hansinger et al. ............. 239/3 |
| 6,793,150 | B2 | 9/2004 | Schaupp et al. |
| 6,817,553 | B2 * | 11/2004 | Steur ............................ 239/690 |
| 6,889,921 | B2 * | 5/2005 | Schaupp ...................... 239/700 |
| 6,896,211 | B2 * | 5/2005 | Seitz ............................ 239/700 |
| 7,017,835 | B2 * | 3/2006 | Vetter et al. ................. 239/380 |
| 7,128,277 | B2 | 10/2006 | Schaupp |
| 7,282,097 | B2 * | 10/2007 | Tanase et al. ............... 118/733 |
| 7,654,472 | B2 * | 2/2010 | Nolte et al. .................. 239/223 |
| 7,726,586 | B2 * | 6/2010 | Murai et al. ................. 239/224 |
| 7,837,135 | B2 * | 11/2010 | Nolte et al. .................. 239/700 |
| 8,720,797 | B2 * | 5/2014 | Yamasaki et al. ........... 239/223 |
| 8,973,850 | B2 * | 3/2015 | Perinet .................. B05B 3/1092 239/223 |
| 9,233,381 | B2 * | 1/2016 | Motozaki .............. B05B 3/1014 |
| 2003/0010841 | A1 * | 1/2003 | Kon ...................... B05B 3/1064 239/224 |
| 2004/0069877 | A1 * | 4/2004 | Schaupp ................ B05B 3/1064 239/700 |
| 2005/0061834 | A1 * | 3/2005 | Garcia et al. ............... 222/321.7 |
| 2006/0138250 | A1 * | 6/2006 | Vetter et al. ................ 239/225.1 |
| 2007/0063068 | A1 * | 3/2007 | Seitz et al. ................... 239/223 |
| 2007/0090204 | A1 * | 4/2007 | Nolte ...................... B05B 3/001 239/225.1 |
| 2009/0212122 | A1 * | 8/2009 | Nolte ..................... B05B 3/1014 239/1 |
| 2009/0266922 | A1 * | 10/2009 | Morgan et al. ............... 239/589 |
| 2010/0206962 | A1 * | 8/2010 | Nolte ...................... B05B 3/001 239/223 |
| 2011/0210180 | A1 * | 9/2011 | Perinet .................. B05B 3/1092 239/1 |
| 2011/0265717 | A1 * | 11/2011 | Fritz et al. ................... 118/620 |
| 2012/0031329 | A1 * | 2/2012 | Sakakibara ............ B05B 5/001 118/626 |
| 2012/0132726 | A1 * | 5/2012 | Seiz ....................... B05B 3/1042 239/225.1 |
| 2012/0168467 | A1 * | 7/2012 | Murphy ...................... 222/465.1 |
| 2012/0180722 | A1 * | 7/2012 | Nolte ..................... B05B 3/1035 118/712 |
| 2013/0153681 | A1 * | 6/2013 | Mitsui et al. ............... 239/225.1 |

FOREIGN PATENT DOCUMENTS

| | | |
|---|---|---|
| FR | 1274814 | 9/1961 |
| JP | 58124560 | 7/1983 |
| JP | 60154554 | 8/1985 |
| JP | 1315361 A | 6/1988 |
| JP | 3169361 | 11/1989 |
| JP | 3221166 | 1/1990 |
| JP | 62140660 | 2/1994 |
| JP | 6116776 | 3/1994 |
| JP | 6094166 | 4/1994 |
| JP | 2771898 B2 | 7/1998 |
| JP | 2001180770 A | 7/2001 |

OTHER PUBLICATIONS

Written Opinion for application No. PCT/US2009/039991 mailed Jun. 24, 2009.

* cited by examiner

SPLASH PLATE RETENTION METHOD AND APPARATUS

CROSS REFERENCE TO RELATED APPLICATIONS

This application is a Nonprovisional U.S. Patent Application of U.S. Provisional Patent Application No. 61/043,570, entitled "Splash Plate Retention Method and Apparatus", filed Apr. 9, 2008, which is herein incorporated by reference.

BACKGROUND

The present invention relates generally to the field of paint spray devices, and more particularly to a new arrangement for retaining a splash plate or deflector in a rotary bell cup.

The number of painting and coating devices are known and have been developed for a range of applications. These include devices that feed paint or other fluid coating materials through a base unit towards an atomizing bell cup. The bell cup is an assembly that is attached to a hollow shaft that rotates in the front of the base. The base is commonly referred to as an atomizer, and often includes an air-driven turbine that may spin at high speeds, typically from 30,000 to 70,000 RPM and above. During operation, the coating material is advanced through the atomizer and into the bell cup assembly. The coating contacts a splash plate or deflector that causes the fluid to be dispersed along the inner surface of the rotating bell cup. Various forms of bell cups are known and are presently in use, often fashioned for different types of paints, coatings, and so forth. The fluid exits an annular area between the splash plate and the bell cup inner surface and flows along the bell cup to an edge from which it is propelled. The bell cup assembly may be charged, or electrodes around the atomizer may charge the paint or coating material to cause it to flow under the influence of static charge towards an oppositely charged workpiece.

Although the particular form of bell cups used in such devices varies, it is typical to provide a splash plate assembly that is fitted into an aperture formed in the base of the bell cup. This assembly is often inserted into the aperture and retained in the aperture by a retaining ring arrangement. A typical conventional arrangement of this type is illustrated in FIG. 4. As shown in this figure, the bell cup C receives an insert I to which the splash plate SP is secured. The splash plate SP may be secured to an insert I by means of pins P, that also serve to space the splash plate from the insert. The insert I has an annular groove G formed around its periphery. A retaining ring R is snapped into this groove and pressed into engagement with a shoulder inside the bell cup as the splash plate and insert are placed in the receiving aperture during assembly.

In this arrangement, as the pins P are pressed into openings in the splash plate and insert provided for this purpose, the openings tend to deform the radially inner surface or floor of the groove G. When this occurs, the groove may require remachining to remove the deformity. Moreover, the retaining ring R inserted into this groove extends radially, and given the deformation, may extend radially too far out of the groove in the areas of such deformity. The retaining ring may be damaged or sheered off during pressing of the splash plate assembly into the bell cup. This may result in the splash plate assembly not being sufficiently robustly assembled into the bell cup to withstand the forces to which the bell cup is exposed in use.

There is a need, therefore, for improved rotary bell cup and splash plate assembly designs. In particular, there is a need for an arrangement that can avoid the problems associated with retaining rings conventionally used in designs of the type discussed above.

BRIEF DESCRIPTION

The present invention provides a novel splash plate and bell cup design that addresses such needs. In particular, the invention offers a rotary bell cup assembly for atomizing paint or a flowable coating, comprising a bell cup and a splash plate assembly. The bell cup has an internal pathway for channeling paint towards an outlet. The splash plate assembly comprises a splash plate disposed in front of the outlet and an insert to which the splash plate is secured, the insert comprising a barbed section configured to enter into snapping engagement with an inner surface of the bell cup to secure the splash plate assembly in the bell cup.

The invention also provides a rotary bell cup assembly for atomizing paint or a flowable coating, that comprises a bell cup having an internal pathway for channeling fluid towards an outlet, and a splash plate assembly comprising a splash plate disposed in front of the outlet and an insert to which the splash plate is secured, the insert comprising a single piece having integral means for interfacing with an inner surface of the bell cup to secure the splash plate assembly in the bell cup.

The invention also provides a splash plate assembly for a rotary bell cup assembly for atomizing paint or a flowable coating, that comprises a splash plate configured to be disposed in front of an outlet of a bell cup, and an insert to which the splash plate is secured, the insert the insert comprising a barbed section configured to enter into snapping engagement with an inner surface of the bell cup to secure the splash plate assembly in the bell cup.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
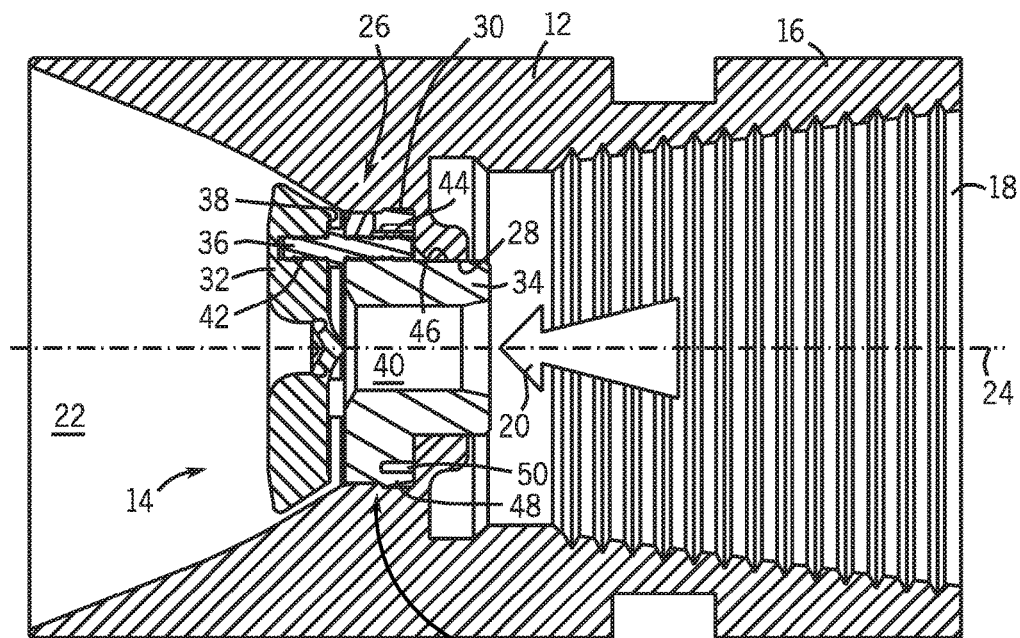
FIG. 1 is a sectional view through an exemplary bell cup in accordance with aspects of the present technique, illustrating one exemplary manner in which the splash plate assembly is positioned and retained in the bell cup.

FIG. 1 is an exemplary illustration of a bell cup assembly 10 that incorporates features of the invention. The assembly is made up of a bell cup 12 and a splash plate assembly 14 assembled in the bell cup as described below. In general, the bell cup will have a body 16 that may be made of a single metal part or an assembly of parts, and that will present a threaded opening 18 adapted to be threaded onto a hollow shaft of an atomizer (not shown). A pathway 20 is defined from the threaded opening through the splash plate assembly and to a bell-shaped surface 22. In operation, the atomizer shaft rotates the bell cup at high speed about its centerline 24 (e.g., a central axis), and injects paint or any other suitable coating through the opening and pathway. The paint or coating flows through the splash plate assembly 14 and around the assembly to form a thin film along the inner wall of the bell surface 22. Owing to the centrifugal forces acting on the paint or coating material, the material is forced to flow towards an outer edge of the bell from which it is broken up into strands or microscopic droplets that are applied to a workpiece (not shown).

The particular arrangement of the bell cup and bell cup body shown in FIG. 1 is intended for illustrative purposes only. Many different forms of such bell cups may be envisaged, and the arrangement for mounting the splash plate assembly in the bell cup can easily be adapted for all of these various designs. For example, while solid walls of the body are illustrated in FIG. 1, in some cases the bell cup may be undercut or formed as a shaped assembly of metal parts that opens towards the outer edge and that may include hollow regions to reduce weight. Moreover, various geometries for the inner surface of the bell may be employed, including curved surfaces, arcuate surfaces, parabolic and stepwise parabolic shapes, conical and stepwise conical shapes, and so forth. Similarly, while the embodiment of FIG. 1 illustrates a region around the lip of the cup in which grooves or serrations are formed, certain other bell cups will not include such features. The present technique, then, is not intended to be limited to the type of bell cup illustrated or to any particular bell cup or bell cup assembly.

In the illustrated embodiment, the body of the bell cup includes a splash plate interface portion 26 that has features designed to receive and hold the splash plate assembly in place. These will be described in greater detail below. Moreover, upstream of the splash plate interface portion 26 is an annular opening 28 that receives the splash plate assembly and through which paint or any coating applied by the bell cup flows. As described in greater detail below, the splash plate interface portion 26 has an inner surface 30 on which features are formed that assist in retaining the splash plate assembly and that also may facilitate its extraction from the bell cup for servicing and replacement.

The splash plate assembly 14 essentially includes a splash plate 32 and an insert 34 to which the splash plate is secured. The splash plate is a generally planar structure extending from the centerline 24 (e.g., the central axis) towards the inner walls of the bell cup and defining an annular opening therebetween through which paint or coating material will flow during operation. The shape of the surfaces of the splash plate may be selected to provide various flow characteristics. For example, flow-directing surfaces on the upstream side of the splash plate may be formed to more smoothly direct the flow of paint or coating material towards the outer edge as in the illustrated embodiment, although certain splash plates or deflectors may not include such features. Similarly, the shape of the outer peripheral side of the splash plate may be parallel to the bell cup inner surface, or the two may form a converging or diverging angle, depending upon how the assembly is intended to meter and distribute flow.

The splash plate is secured to the insert 34 by a series of pins 36. A suitable number of such pins may be provided, and in a presently contemplated embodiment three such pins are positioned at radially symmetrical locations in the assembly. Each pin in the illustrated embodiment includes a center portion that defines a desired distance between the splash plate and the insert, acting as a standoff at this location. The pins, therefore, appropriately position a rear surface 38 of the splash plate with respect to a front surface of the insert. The insert includes an internal pathway 40 (e.g., a fluid passage) that is in fluid communication with the space between the insert and the rear surface 38 of the splash plate. Recesses 42 are provided in the splash plate to receive an extension of pins 36, with similar recesses 44 being formed in the insert.

The splash plate and insert may be made of any suitable material, such as filled or un-filled acetal resin. The pins, on the other hand, may be made of a more rigid material, such as stainless steel. In the embodiment illustrated, the pins are barbed to prevent them from being easily removed from the splash plate and insert.

The insert, on a side opposite the splash plate, has an annular extension 46 that extends into and it is received by the opening 28 formed in the bell cup. The annular extension 46 (e.g., a body portion) is surrounded, at least partially, by a skirt 48 that can be elastically deformed during insertion and removal of the insert, and splash plate assembly generally. An annular space 50 separates the skirt 48 from the extension 46 of the insert to permit inward deflection of the skirt 48 during its elastic deformation.

Figure 2:
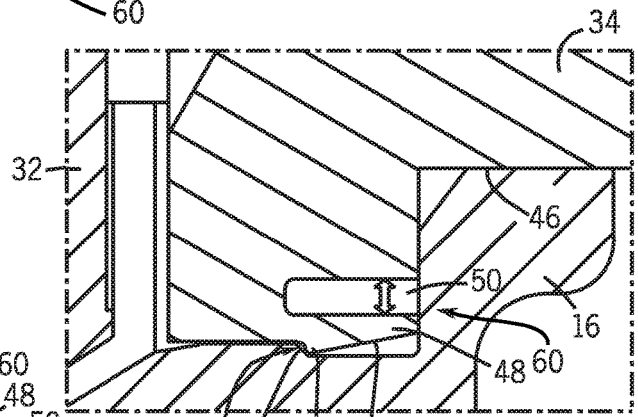
FIG. 2 is a detailed view of the arrangement shown in FIG. 1, illustrating particular arrangements for retaining the splash plate assembly and the bell cup.

These features are illustrated in greater detail in FIG. 2 which is a view of the lower side of the insert interface with the bell cup body taken from the view of FIG. 1. As noted above, the insert 34 is received in the body 16 of the bell cup. The skirt 48 at least partially surrounds an opening or a space 50 between this skirt and the extension 46 of the insert. One or more barbs 52 are formed around the peripheral side of this skirt. The barbs, which may be rounded, tapered, or otherwise formed, define an extension that is received by a shoulder 54 formed on the inner surface of the bell cup. Moreover, the skirt 48 presents a tapered surface on the insertion side of the skirt forward of the barb 52. Thus, when the insert is engaged into the bell cup, the tapered surface 56 translates an insertion force into a force that tends to elastically deform the skirt inwardly as indicated by the arrow in FIG. 2. As the barb 52 clears shoulder 54, then, the skirt may return radially outwardly such that the barb remains engaged on shoulder 54 to retain the insert and splash plate assembly in place.

In the illustrated embodiment, the assembly also includes features that assist in removing the insert and splash plate assembly from the bell cup for servicing and replacement. In particular, as best illustrated in FIG. 2, shoulder 54 has a tapered shape or chamfer against which the barb 52 bares during normal operation. A force against the insert from inside threaded opening of the bell cup (see FIG. 1) can urge elastic deformation of the skirt as the barb 52 is compressed by the tapered surface 54 of the bell cup. Once the barb 52 escapes the shoulder 54, then, the insert may be easily removed from the bell cup.

Figure 3:
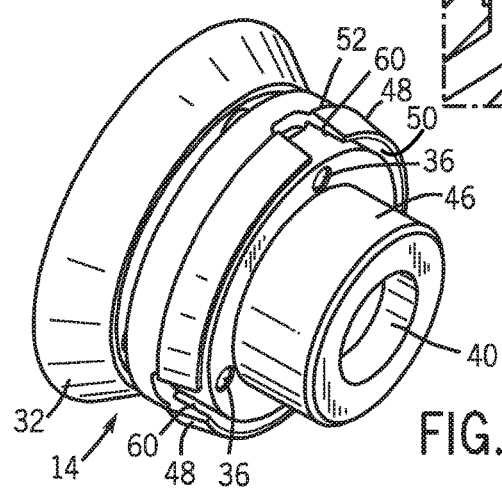
FIG. 3 is a rear perspective view of the same splash plate assembly removed from the bell cup.
Figure 4:
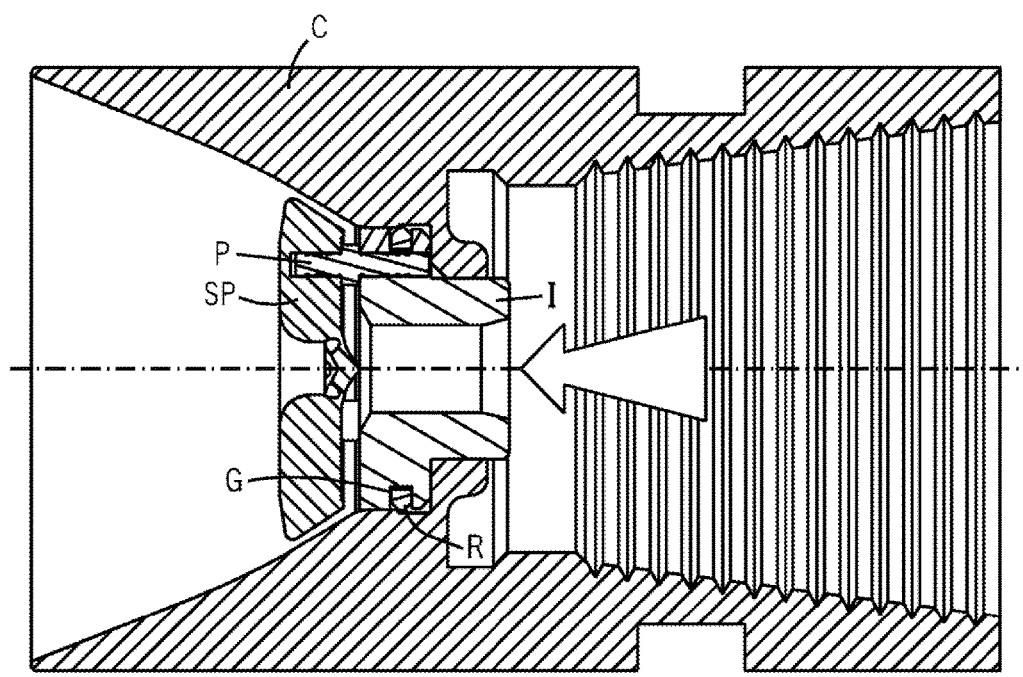
FIG. 4 is a sectional view of an exemplary bell cup and splash plate assembly in accordance with a conventional design.

In a presently contemplated embodiment, the skirt is slotted to facilitate its elastic deformation. This is best illustrated in FIG. 3. As can be seen in FIG. 3, the insert is mated to the splash plate as described above, with annular extension 46 extending rearwardly of the skirt 48. Pins 36 can also be seen extending into the insert. The skirt 48, including the barb 52, includes a series of slots 60 that break the skirt into segments and allow it to more easily deformed during insertion and removal of the splash plate assembly. In the illustrated embodiment, these slots are provided in locations corresponding to the positions of the pins 36. Thus, even if the material of the insert is deformed by insertion of the pins, any deformation will not affect the performance of the retaining mechanism as defined by the barbed skirt 48. In practice, any number of slots may be provided, depending upon such factors as the stiffness of the material, the length of the skirt, the insertion and removal force desired, and so forth. Indeed, the skirt may be reduced to a series of barbed extensions in certain embodiments. All such variants are intended to fall within the scope of the present invention as defined by the appended claims.

The resulting structure is susceptible to conventional manufacturing techniques (e.g., molding and/or machining), while providing a robust structure that securely holds the splash plate assembly in place during use. As noted above, the arrangement can be adapted to various bell cup and splash plate designs and configurations, while still avoiding problems with conventional designs, particularly those that rely on retaining rings and similar structures for retention. Moreover, the design may be retrofitted to many existing bell cups without alteration of the bell cups, particularly those that include shoulders or similar internal features with which the integral barbed features of the splash plate assembly may interface to exert a holding force.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A spray coating system, comprising:
   a bell cup having a bell-shaped surface extending downstream from a central opening, wherein the bell cup comprises a shoulder along the central opening; and
   a splash plate assembly coupled to the central opening, wherein the splash plate assembly comprises:
      a splash plate; and
      an insert coupled to the splash plate, wherein the insert comprises:
         a fluid passage extending toward the splash plate;
         a plurality of skirt portions located on an outer peripheral side of the insert, wherein the plurality of skirt portions are disposed circumferentially about a central axis of the insert, wherein each of the plurality of skirt portions comprises a barb protruding radially outward from the outer peripheral side of the insert relative to the central axis; and
         an integrally formed annular extension located on a side of the insert opposite the splash plate, wherein the fluid passage extends through the annular extension, wherein the annular extension extends into and is received by an opening of the bell cup;
         an annular space that extends about a body portion of the insert, wherein the annular space is disposed radially between the body portion and the plurality of skirt portions, and wherein the annular space, the fluid passage, and the outer peripheral side of the insert including the plurality of skirt portions are circumferentially disposed from a common central axis of the insert, wherein each of the plurality of skirt portions is configured to move radially inward into the annular space toward the fluid passage, and each of the plurality of skirt portions is configured to position the respective barb to engage with the respective shoulder in the central opening, wherein the outer peripheral side of the insert including the barb is located axially between the splash plate and the annular extension; and
         an axial slot between a first continuous skirt portion and a second continuous skirt portion of the plurality of skirt portions, wherein a first circumferential length of each of the first and second continuous skirt portions is greater than a second circumferential length of the axial slot.

2. The system of claim 1, wherein the splash plate and the insert are separate pieces of the splash plate assembly, and the splash plate is secured to the insert by at least one fastener.

3. The system of claim 1, wherein the barb on each of the plurality of skirt portions extends continuously between the axial slots in adjacent skirt portions of the plurality of skirt portions.

4. The system of claim 1, wherein each of the plurality of skirt portions comprises a tapered surface adjacent the barb.

5. The system of claim 1, wherein each of the plurality of skirt portions comprises only one barb protruding radially outward relative to the central axis.

6. The system of claim 1, wherein the splash plate is secured to the insert by three fasteners.

7. The system of claim 1, wherein the barb of each of the plurality of skirt portions is configured to enter into snapping engagement with a shoulder along the central opening of the bell cup to secure the splash plate assembly in the bell cup.

8. The system of claim 1, wherein the insert comprises a synthetic resin.

9. The system of claim 1, comprising a second axial slot between adjacent skirt portions of the plurality of skirt portions.

10. The system of claim 9, comprising a third axial slot between adjacent skirt portions of the plurality of skirt portions.

11. A system, comprising:
    a splash plate assembly configured to couple to a central opening of a bell cup, wherein the bell cup has a bell-shaped surface extending downstream from the central opening, wherein the bell cup comprises a shoulder along the central opening, wherein the splash plate assembly comprises:
       a splash plate; and
       an insert coupled to the splash plate, wherein the insert comprises:
          a fluid passage extending toward the splash plate;
          a plurality of skirt portions located on an outer peripheral side of the insert, wherein the plurality of skirt portions are disposed circumferentially about a central axis of the insert, wherein each of the plurality of skirt portions comprises a barb protruding radially outward from the outer peripheral side of the insert relative to the central axis; and
          an integrally formed annular extension located on a side of the insert opposite the splash plate, wherein the fluid passage extends through the annular extension, wherein the annular extension extends outwardly and is configured to be received by the opening of the bell cup;
          an annular space that extends about a body portion of the insert, wherein the annular space is disposed radially between the body portion and the plurality of skirt portions, and wherein the annular space, the fluid passage, and the outer peripheral side of the insert including the plurality of skirt portions are circumferentially disposed from a common central axis of the insert, wherein each of the plurality of skirt portions is configured to move radially inward into the annular space toward the fluid passage, and each of the plurality of skirt portions is configured to position the respective barb to engage with the respective shoulder in the central opening, wherein the outer peripheral side of the insert including the barb is located axially between the splash plate and the annular extension; and an axial slot between a first continuous skirt portion and a second continuous skirt portion of the plurality of skirt portions, wherein a first circumferential length of each of the first and second continuous skirt portions is greater than a second circumferential length of the axial slot.

12. The system of claim 11, wherein the splash plate and the insert are separate pieces of the splash plate assembly, and the splash plate is secured to the insert by at least one fastener.

13. The system of claim 11, wherein the barb on each of the plurality of skirt portions extends continuously between the axial slots in adjacent skirt portions of the plurality of skirt portions.

14. The system of claim 11, wherein each of the plurality of skirt portions comprises a tapered surface adjacent the barb.

15. The system of claim 11, wherein each of the plurality of skirt portions comprises only one barb protruding radially outward relative to the central axis.

16. The system of claim 11, wherein the insert comprises a synthetic resin.

17. The system of claim 11, comprising a second axial slot between adjacent skirt portions of the plurality of skirt portions.

18. The system of claim 11, comprising a third axial slot between adjacent skirt portions of the plurality of skirt portions.

19. The system of claim 11, comprising the bell cup having the splash plate assembly coupled to the central opening.

20. The system of claim 19, comprising a coating device having the bell cup with the splash plate assembly.

* * * * *